E. FENNELL.
INDICATOR FOR MUSICAL INSTRUCTION.
APPLICATION FILED JUNE 23, 1920.
1,400,947.
Patented Dec. 20, 1921.
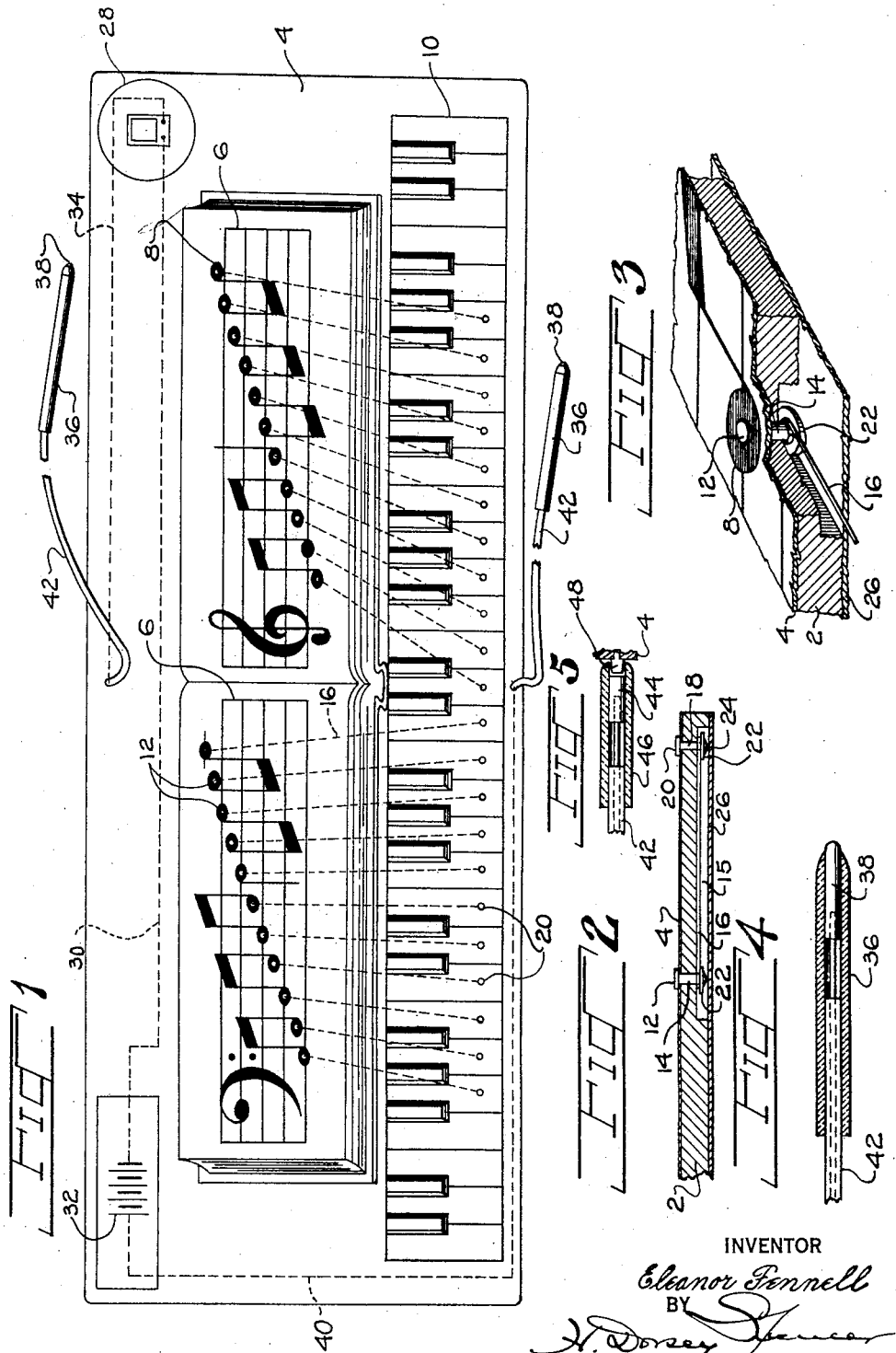
INVENTOR
Eleanor Fennell
BY
H. Dorsey Spencer
ATTORNEY

UNITED STATES PATENT OFFICE.

ELEANOR FENNELL, OF NEW YORK, N. Y.

INDICATOR FOR MUSICAL INSTRUCTION.

1,400,947.

Specification of Letters Patent.  Patented Dec. 20, 1921.

Application filed June 23, 1920. Serial No. 391,014.

*To all whom it may concern:*

Be it known that I, ELEANOR FENNELL, a citizen of the United States, residing at 121 West 121st street, New York city, N. Y., have invented certain new and useful Improvements in Indicators for Musical Instruction, of which the following is a clear, full, and exact description.

This invention relates to apparatus for use in self-instruction, particularly in music, and is herein shown as embodied in apparatus which is particularly intended for the use of children who are beginning the study of music. It will be understood, however, that the invention is not restricted to the embodiment or uses herein specifically shown and described, and that many features of the invention are of general utility in apparatus for use in self-instruction.

A general object of the invention is to provide apparatus for the purposes above set forth, which will present the subject or art to be studied in such a manner that correlation is required—as, for example, of the notes on a musical staff with the keys of the instrument keyboard—together with means which requires the student to select the elements to be correlated and which indicates when the correct correlation of elements has been obtained by the giving of a suitable signal. More particularly the invention aims to interest children in the study of musical notation, by providing apparatus in which the relationship of the notes upon a musical staff to the keys of an instrument keyboard will be audibly indicated when the child has formed the proper connection on the one hand with the note on the staff and on the other hand with the key or representation of the key on the keyboard, whereby a selective effort will be required both with respect to the note and with respect to the key, thus fixing the child's attention both upon the note and upon the key and upon the relationship of the two, the signal indicating the relationship when the note associated with the key has been correctly selected, or vice versa.

Other objects and important features of the invention will appear from the following description and claims when considered in connection with the accompanying drawings, in which—

Figure 1 is a plan view of apparatus embodying the present invention;

Fig. 2 is a sectional detail showing the wiring which connects one of the notes with one of the keys;

Fig. 3 is a combined perspective and sectional detail illustrating one form of contact which may conveniently be used with the notes on the musical staff;

Fig. 4 is a sectional detail of one form of movable contact member or selecting device; and Fig. 5 is a sectional detail showing a modified form of movable contact member and one of its associated stationary contacts.

One of the practical objects of the present invention is to provide apparatus for self-instruction in music which can be manufactured at a relatively small cost so that it may go into general use, and to this end the illustrated embodiment of the invention is shown as comprising a board 2, having upon one face—either upon the board itself or upon a cardboard cover 4—musical staffs 6 on which are musical notes 8—the illustrated apparatus showing two staffs, the one at the left being for the bass, and the one at the right being for the treble, with the notes corresponding to each.

The illustrated board has also depicted thereon a musical instrument keyboard 10, the illustrated keyboard being that of a piano or organ. For convenience, the illustrated keynote comprises only slightly more than the number of octaves required to show the relationship of the notes on the musical staffs to the keys of the keyboard.

Each of the notes 8 of the musical staff is provided, preferably within its outline, with a contact member 12 which may be formed in any suitable manner, the illustrated member being in the form of a small circular head of a rivet, the shank 14 of which passes through the board into a recess 15 on the under side of the board and has attached to it within this recess one end of a wire 16 connected to another rivet 18, the head 20 of which forms an exposed contact on the keyboard key corresponding to the note on the scale with which the contact 12 is associated. The wires 16 may be connected to their associated rivets and at the same time the rivets may be secured in their position on the board by washers 22, between which and the under side of the board the wires are confined, the rivets being headed up as shown at 24 to hold the washers in place. To protect the wiring and also improve the general appearance of the board, the recess 15 in the under side of the board may be covered by a piece of cardboard 26 which preferably also covers the whole underside of the board 2.

Each of the notes 8 upon the musical staffs has a wire 16 connecting its contact 12 with a contact on the corresponding key of the keyboard, and the bridges thus formed are utilized to complete a circuit through electrical signaling means which may be either audible or visible, the illustrated means being shown as constituted by a buzzer 28, which may be located upon the upper face of the board 2. The buzzer 22 has one of its terminals connected by wire 30, preferably in a recess, not shown, on the under side of the board 2, with one pole of a battery 32 which may be an ordinary dry cell battery carried upon the upper face of the board 2, and has its other terminal connected by a wire 34 with a note selecting contact member comprising an insulating handle 36 and a contact point 38, the contact surface exposed at the point 38 being preferably relatively small so that not more than one of the contacts 12 can be engaged by it at one time. The other pole of the battery 32 is connected by wire 40 with another selecting device like the one first described and comprising an insulating handle 36 and a contact point 38. For convenience, the insulating cable 42, which permits the note selecting contact point 38 to be moved into contact with the contact member 12 on any of the notes on either of the staffs, may come out of the board about midway of its length near the upper edge thereof, as shown, and likewise the cable 42 for the other contact point may come out of the board about midway of its length near its lower edge.

From the foregoing description, the operation of the device will readily be understood. The operator will preferably take one of the handles 36 of the movable selecting devices in one hand and the other in the other hand, and will either first move the note selector to bring its point 38 into contact with the contact member 12 of one of the notes upon the staff, the key corresponding to which it is desired to locate, or will first move the key selector to bring its point 38 into contact with the contact member 20 of the key, the note corresponding to which it is desired to locate, and will then move the other selector until either the key or the note has been reached which corresponds with the note or key first selected, whereupon the completion of the circuit thus affected will cause the buzzer 28 to sound a signal indicating that the correct answer to the problem has been obtained. By providing self-instruction means operating thus somewhat after the manner of a game or puzzle, the interest of the child is aroused and the relationship of the instrument keyboard and the notes on the musical staffs is soon learned.

It will be apparent that with the selector construction shown in Figs. 1 and 4 a circuit could be made through the electrical buzzer by simply bringing the points 38 together. To avoid such an operation of the buzzer, the selectors may be made in the manner shown in Fig. 5, with the contact 44 set back within a recess within the insulated handle 46, in which case the coöperating contact members upon the keys and notes would have to project above the surface of the cardboard 4 to such an extent that each would reach into the recess in the handle 46 sufficiently far to come into contact with the member 44. A contact member having a form suitable for use with the modified selector shown in Fig. 5 is also shown in this figure at 48.

What I claim as new is:

1. In apparatus for use in musical instruction, a chart having thereon a musical staff with notes on said staff, means representing the keyboard of a musical instrument with respect to which instruction is to be given, a signal, signal operating means comprising means connecting the notes on said staff with the keys on said keyboard, and independent means for connecting each with the signaling means and requiring independent selection of a note corresponding to the selected key, or vice versa, to produce a signal.

2. In apparatus for use in musical instruction, a chart having thereon a musical staff with notes on said staff, means representing the keyboard of a musical instrument with respect to which instruction is to be given, a movable note selecting member, signaling means and means comprising a connection between the signaling means and the note selecting member and a key differentiating connection to the signaling means whereby a signal is given when said note selecting member is placed on a note corresponding to a selected key of the keyboard.

3. In apparatus for use in musical instruction, a chart having thereon a musical staff with notes on said staff and having also depicted thereon a musical keyboard, signaling means, a movable note-engaging member, a movable key-engaging member and connections between said signaling means and said members and between said notes and said keys, whereby a signal is given when said note-engaging member is on the note corresponding to the key which said key-engaging member engages.

4. In apparatus for use in musical instruction, a chart having thereon a musical staff and notes on said staff and also having depicted thereon a musical keyboard, movable note-selecting means adapted to be moved by the operator into position on one of the notes on said staff, movable key-selecting means adapted to be moved by the operator into position on one of the keys of said keyboard, a signaling device and connections between said device and said note and key selecting means and between said notes and said keys, whereby a signal is given when the note selecting means is upon a note corresponding to the key upon which the key-selecting means is located.

5. In apparatus for use in musical instruction, a chart having thereon a musical staff and also having depicted thereon a musical keyboard, notes on said staff, electric signaling means, and means for completing a signal operating circuit comprising a movable note-selecting circuit terminal, a movable key selecting circuit terminal, and connections between the respective keys and the corresponding notes, each connection being provided with a contact at its note end and also at its key end.

6. Apparatus for use in musical instruction comprising a chart having thereon a musical staff and also having thereon a musical keyboard, notes upon said staff, a note selector adapted to engage the notes upon said staff, a key selector adapted to engage the keys of the keyboard, signaling means and connections between said note and key selectors and between said signaling means and the notes and the corresponding keys whereby said signaling means is operated whenever either selector is moved to contact with a note or key corresponding to the key or note upon which the other selector is located.

Signed at New York city, N. Y., this 21st day of June, 1920.

ELEANOR FENNELL.

Correction in Letters Patent No. 1,400,947.

It is hereby certified that in Letters Patent No. 1,400,947, granted December 20, 1921, upon the application of Eleanor Fennell, of New York, N. Y., for an improvement in "Indicators for Musical Instruction," an error appears in the printed specification requiring correction as follows: Page 3, lines 33 and 34, strike out the words "said signaling means and" and insert the same to follow the word "between" in line 32; and that the said Letters Patent should be read with this correction therein that the same may conform to the record of the case in the Patent Office.

Signed and sealed this 17th day of January, A. D., 1922.

[SEAL.] KARL FENNING,
*Acting Commissioner of Patents.*